March 29, 1949. K. L. CURTIS ET AL 2,465,358
ENGINE SYNCHRONIZER
Filed Oct. 4, 1943 6 Sheets-Sheet 2
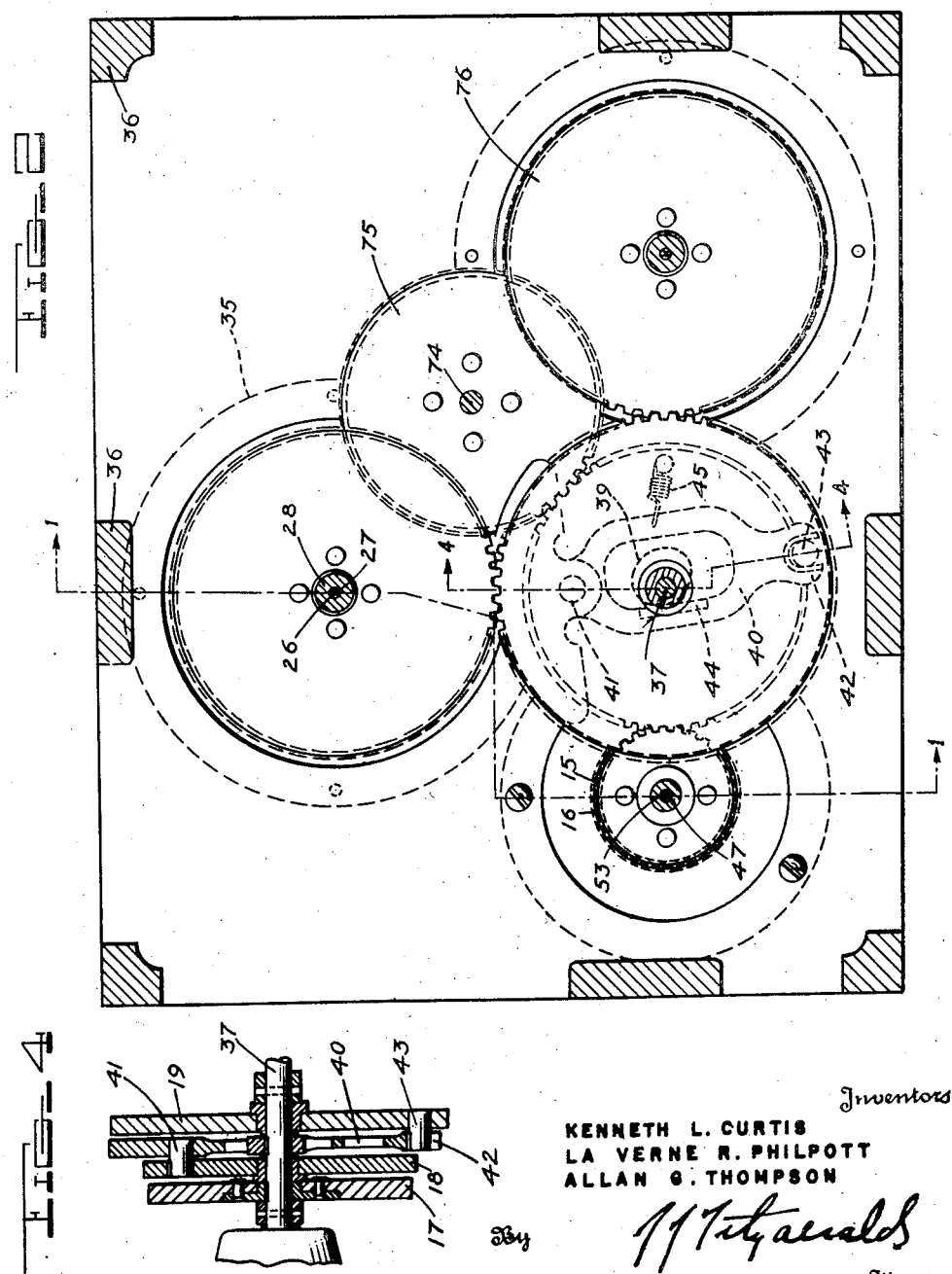
Inventors
KENNETH L. CURTIS
LA VERNE R. PHILPOTT
ALLAN G. THOMPSON
By J J Fitzgerald
Attorney Inventors
KENNETH L. CURTIS
LA VERNE R. PHILPOTT
ALLAN G. THOMPSON By
Attorney

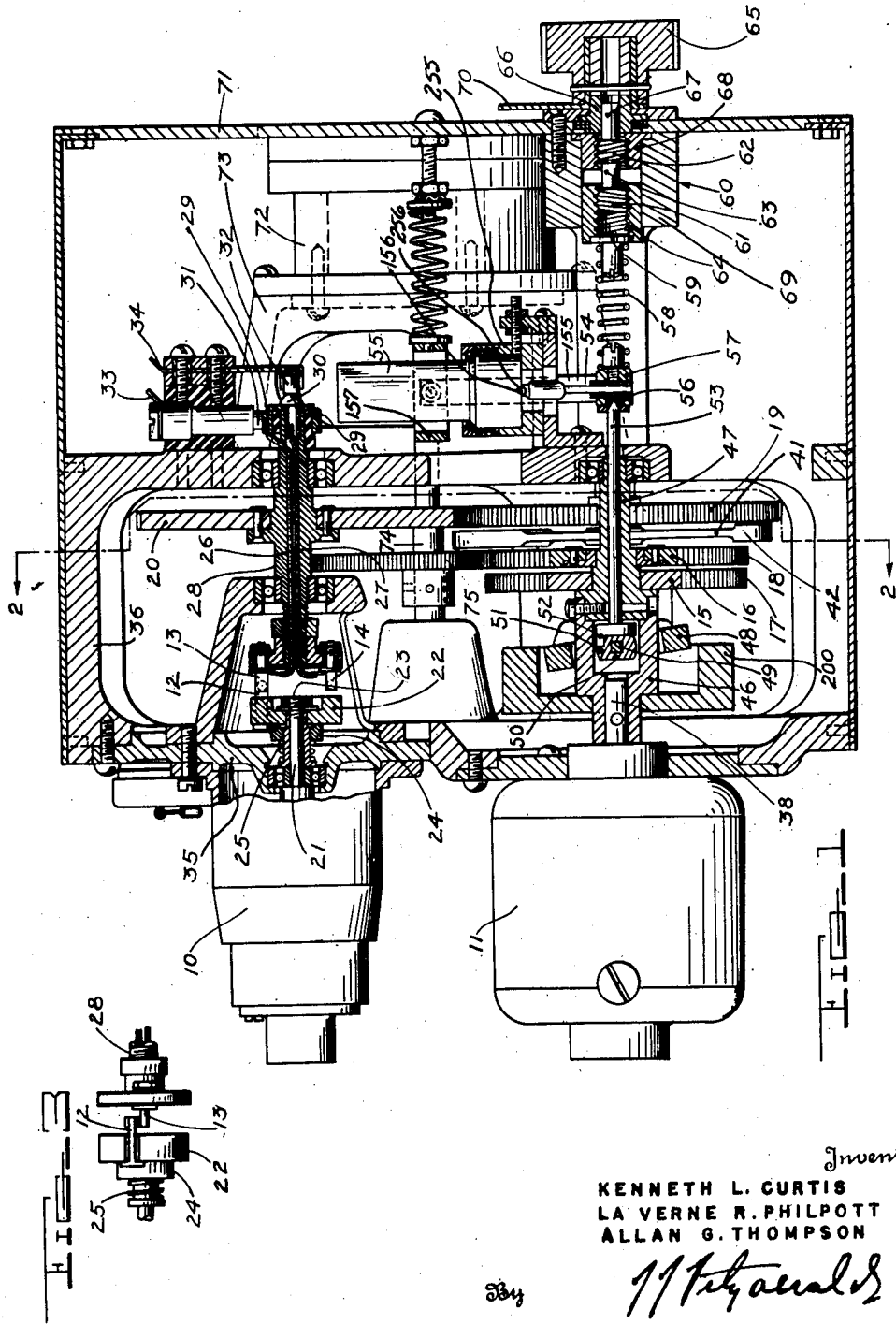

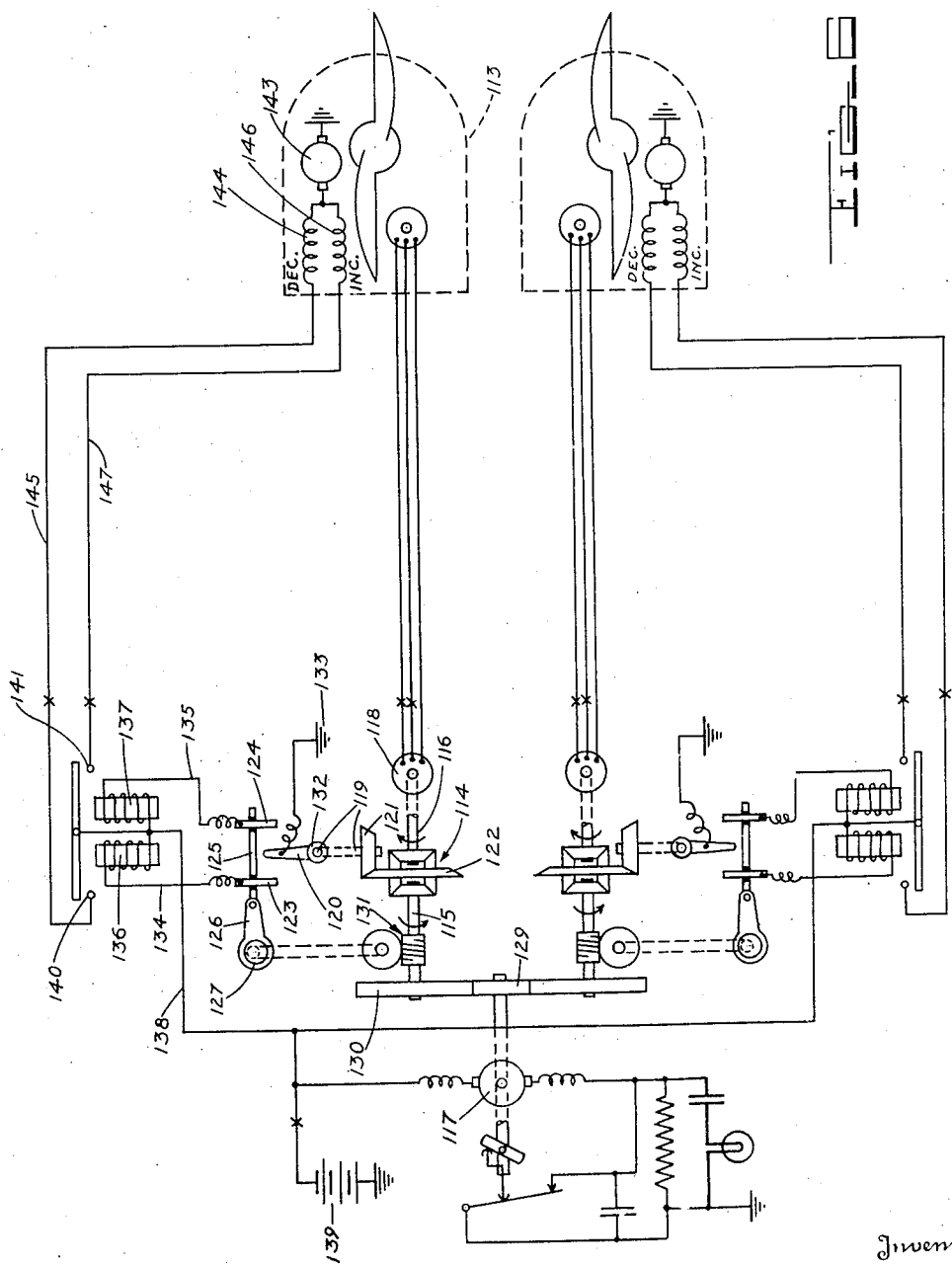

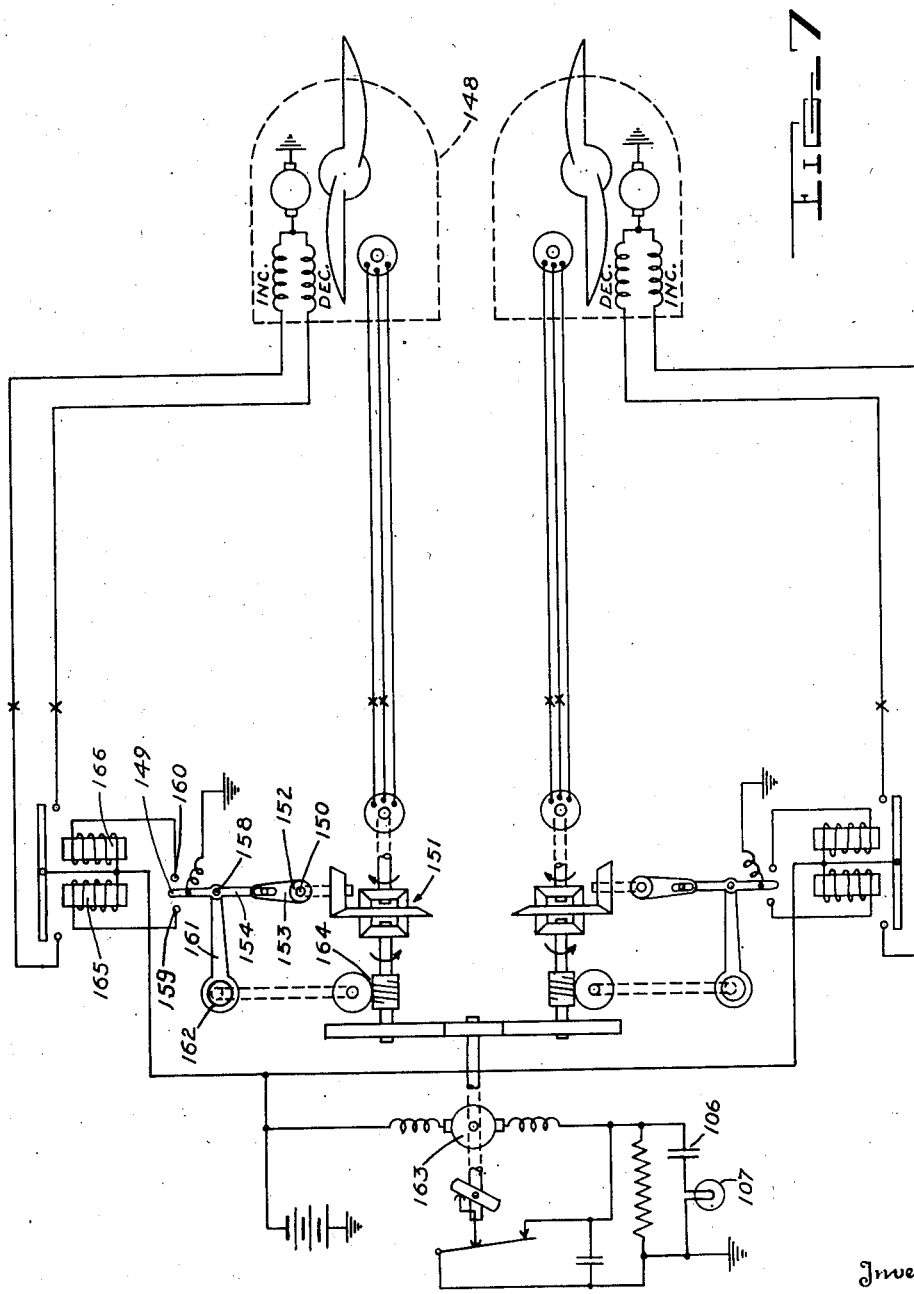

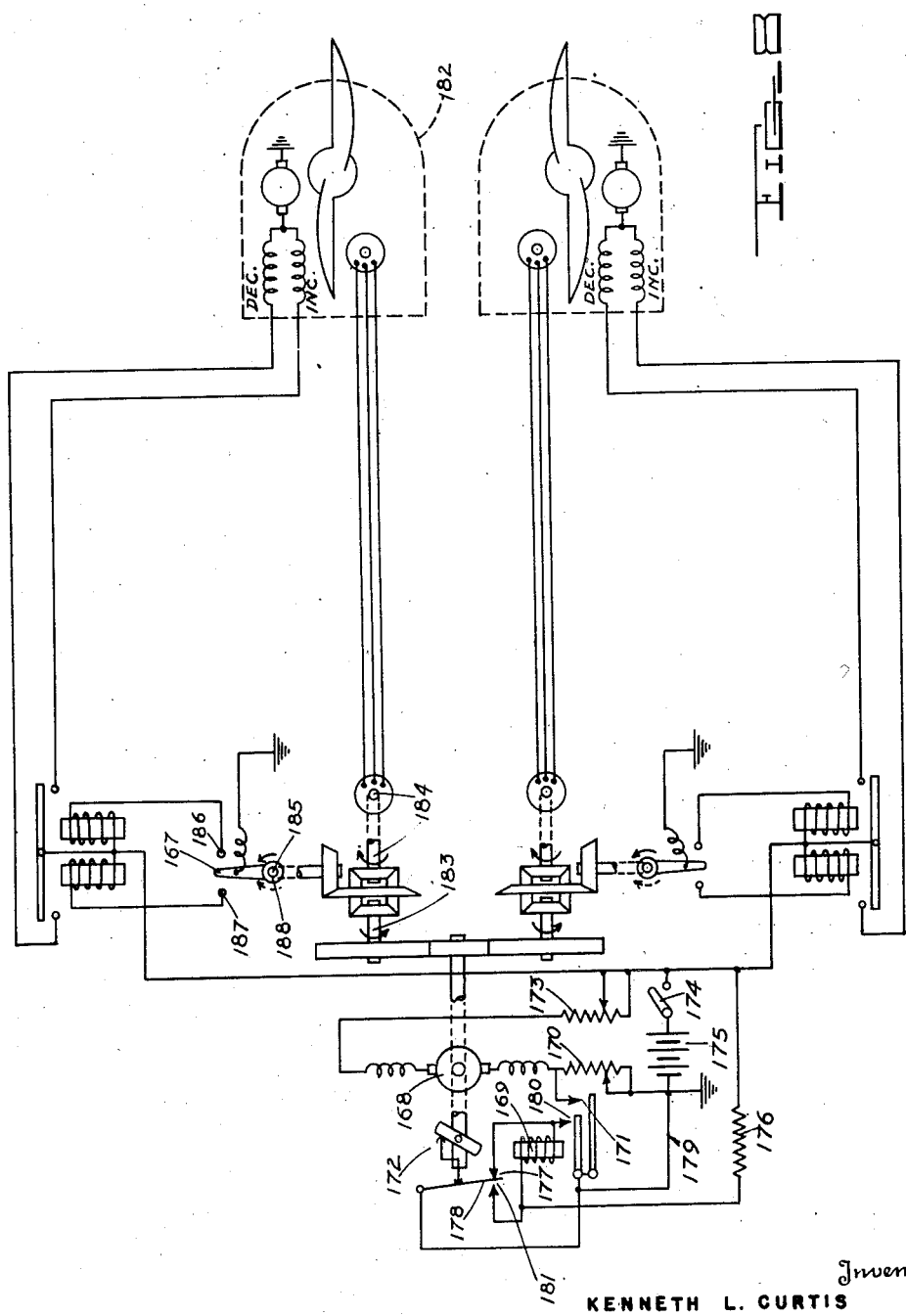

Patented Mar. 29, 1949

2,465,358

UNITED STATES PATENT OFFICE 2,465,358

ENGINE SYNCHRONIZER

Kenneth L. Curtis, United States Navy, La Verne R. Philpott, and Allan G. Thompson, Washington, D. C.

Application October 4, 1943, Serial No. 504,880

1 Claim. (Cl. 175—355)

(Granted under the act of March 3, 1883, as amended April 30, 1928; 370 O. G. 757)

The present invention relates in general to synchronizing apparatus for multiple engine power plants and particularly the power plants of multi-engine airplanes.

An important object is the provision of an apparatus of minimum weight and bulk having simplicity and ruggedness of structure, and substantially shock proof.

Another object is the provision of a simplified control circuit with a minimum number of circuit breaking elements and other electrical components affording improved reliability in operation, low cost upkeep and low power consumption, the latter resulting in reduction of battery weight and volume.

A further object is the provision of an improved means for effecting a step-by-step adjustment of the speed control means known as notching with improvement in operation whereby the adjustment will be effected through cor rol impulses of substantially constant frequency but with shorter and shorter impulses as synchronism is approached.

A further object is the provision of a synchronizing system in which the various control circuits and apparatus elements except those requiring direct mechanical connection with the engines to be synchronized are constructed and arranged to be mounted as a unit directly on the pilot's instrument panel of an airplane.

A further object is the provision of control elements balanced against displacement by sudden changes in velocity or direction of movement of the craft in which the apparatus is carried.

Various other objects and advantages of the invention will become apparent from a perusal of the following specification and the drawings accompanying the same.

In the drawings:

Fig. 1 is a vertical, longitudinal staggered section taken on the line 1—1 of Fig. 2.

Fig. 2 is a vertical, transverse section taken on the line 2—2 of Fig. 1.

Fig. 3 is a fragmentary detailed view of the selecting and selectable contact assemblage.

Fig. 4 is a fragmentary detail, cross sectional view of the velocity fluctuating mechanism taken on the line 4—4 of Fig. 2.

Fig. 6 is a diagram of a modification utilizing a mechanical differential gear for controlling the selection of direction of adjustment and an oscillatory movement of the selectable contacts for notching.

Fig. 7 is a diagram of a modification in which both components of the relative movement between the selecting and selectable contacts are imparted to the selecting contact.

Fig. 8 is a diagram of a modification in which the notching component of the relative movement between the contacts is derived from the master motor.

Figure 5:
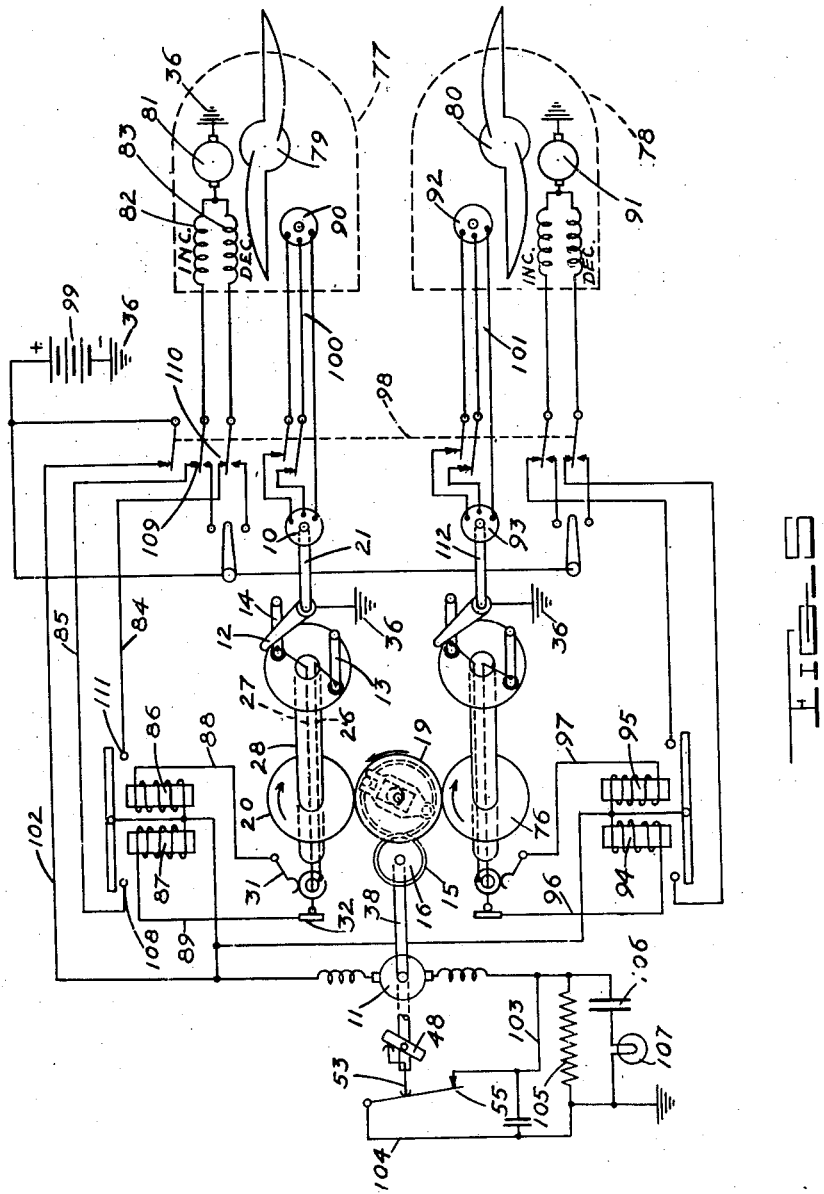
Fig. 5 is a diagram of a synchronizing system embodying the apparatus shown in Figs. 1 to 4.

Referring first to Figs. 1 to 4, these illustrate the mechanical structure of a preferred form of automatic synchronizing device embodying the principles of the present invention and capable of being mounted on the pilot's instrument panel of an airplane. Here a master motor 11 adjustable to a desired standardizing speed, and an engine-controlled synchronous motor 10, jointly act upon a speed-comparing device comprising a completely rotatable selecting contact 12 and a pair of completely rotatable selectable contacts 13 and 14 rotatable in trailing and leading relation respectively, with the selecting contact, the selecting contact 12 being driven by the synchronous motor unit 10 while the selectable contacts 13 and 14 are driven from the master motor through transmission gear assemblage 15 to 20. The term completely rotatable as used above, is intended to indicate the quality of being able to make one or more complete rotations in the manner of a wheel as distinguished from a pendulum. Through this connection, disregarding for the moment a velocity fluctuating mechanism incorporated in the gear assemblage 15 to 20 and to be later described, the relative motion between the selector contact and the selectable contacts will vary in direction and bring the selecting contact 12 into engagement with either the leading or trailing selectable contact 13 or 14 according as to whether the selecting contact 12 is rotated faster or slower than the selectable contacts. To enable the contacts to engage without interference with the relative rotation of their respective driving motors, the selecting contact 12 is connected with the driving shaft 21 of the synchronous motor by means of a face plate 22 rotatably mounted on a reduced portion 23 of the shaft and in frictional engagement with a friction slip-clutch element 24 driven by the shaft, the clutch element 24 being mounted for rotation with the shaft but slidable thereon and spring-pressed against the back of the face plate 22 by a compression spring 25 tensioned to permit the contacts to engage under pressure sufficient to effect adequate electrical contact without detrimental variation in load on the motors. Insulated control-circuit conductors 26 and 27 lead from the selectable contacts 13 and 14 through the hollow drive shaft 28 to a slip ring 29 and concentric contact stud 30 from which electrical connection is extended through brushes 31 and 32 to control circuit terminals 33 and 34, respectively. Thus with the selecting contact 12 electrically connected with one side of a source of current in suitable manner as through the face plate 22, shaft 21 and frame elements 35 and 36, engagement of the selecting contact with one or the other of the selectable contacts will extend the connection through one or the other of the terminals 33 or 34 to different responsive means suitably connected to the other side of the current source and operable to effect an increase or decrease in the engine speed through a suitable propeller pitch-control motor not shown, all in a manner to be later described in reference to the circuit diagram of Fig. 5.

To avoid or reduce to a minimum, any tendency to hunting between the master motor and a controlled engine, it is desirable to provide for a rapid adjustment of the propeller pitch by a full and continuous operation of the pitch-control motor during wide departure from synchronism, with finer adjustment through intermittent brief operations of the pitch-control motor, known as notching, at slight departures from synchronism. To this end, a velocity fluctuating mechanism is inserted in the transmission gear-train 15 to 20 between the master motor 11 and the selectable contacts 13—14. This comprises a countershaft 37 (Fig. 4) driven from the master motor through the gear 17 keyed to the countershaft and meshing with the gear 15 (Fig. 1) keyed to the shaft extension 47 of the master motor. A cam 39 (Figs. 2 and 4) is keyed on the countershaft 37 between two free gears 18 and 19, the gear 18 being driven at a speed different from that of the gear 17 by the master motor through gear 16 keyed to the motor shaft extension 47, while the gear 19 is driven from the gear 18 through an oscillating lever 40 pivotally mounted on the gear 18 at 41 and engaging the gear 19 through a forked end 42 and a pin 43 carried by the gear 19. Oscillatory motion relative to the gear 18 is imparted to the lever 40 by action of the cam 39 upon the cam-follower 44 (Fig. 2) carried by the lever 40, the cam-follower being held in continuous engagement with the cam by a retractile spring 45 connected between the lever 40 and the gear 18. The gear 19 is thus oscillated relative to gear 18 while being rotated by the latter about the countershaft 37.

In the present embodiment, the gears are so proportioned that with the master motor and gears 15 and 16 running at 1800 R. P. M., as where it is desired to maintain an engine at such speed, the gear 18 which carries the lever 40 with it around the countershaft will run at 900 R. P. M., while the countershaft 37 driven by gear 17, will run at 960 R. P. M., rotating cam 39 at the latter speed. From the above it will be clear how the lever and cam rotating about the axis of the countershaft in the same direction but at different angular velocities, will produce a rotation of the cam relative to the lever with the result that the lever will be moved through 60 complete cycles of oscillation relative to the gear 18 during each 900 rotations of the gear 18 causing the gear 19 to rotate at a fluctuating velocity of 900 R. P. M. plus or minus the angular displacements between 18 and 19. Accordingly, the gear 19 is rotated at a fluctuating velocity averaging the velocity of the gear 18 over successive recurring periods of 15 revolutions of the gear 18. It will be understood that the average velocity of the gear 19 need not be equal to that of the gear 18 so long as the ratio of such average velocity to that of the gear 18 is constant, and the transmission ratio between master motor 11 and selectable contacts 13—14, and between the engine and the selecting contact 12 is such that the two sets of contacts will rotate at the same angular velocity when the engine is running at a speed predetermined relative to the master motor. This fluctuating velocity is transmitted to the driving shaft 28 of the selectable contacts through the gear 20, the latter gear being secured to the shaft 28 and of equal pitch diameter with the gear 19, the fluctuations occurring at a frequency of 60 per minute. There is thus superimposed upon the basic rotary movement of the selectable contacts 13 and 14 a periodic velocity variation resulting in a periodic oscillatory relative motion between the driving shaft 21 of the selecting contact and the driving shaft 28 of the selectable contacts. The amplitude of such oscillatory movement is determined by the throw of the lever 40 and is considerably less than the limit of angular movement of the selecting contact in moving from one to the other of the selectable contacts as determined by the spacing of the latter, with the result that with both the synchronous motor shaft 21 and the selectable-contact driving shaft 28 running in synchronism and in the same direction, it is possible for the selecting contact 12 to remain out of engagement with both of the selectable contacts 13 and 14 with a substantial gap on each side. When the synchronous motor element 10 slightly gains or loses speed with respect to the master motor, the selecting contact, will engage one or the other of the selectable contacts with the selectable contact thus engaged, repeatedly moving out of and back into engagement with the selecting contact due to the fluctuating velocity of the selectable contact. This results in intermittent brief closures of the control circuit of the pitch control motor and a notching operation of the latter. At a greater gain or loss of the synchronous motor with reference to the master motor the rate of movement of the selecting contact toward one or the other of the selectable contacts will be greater so that the intermittent engagements will occur sooner and separations later with consequent longer intermittent closures of the control circuit. At still greater departures from synchronism resulting in a rate of relative rotation between the synchronous motor shaft and the selectable contacts sufficiently great or greater than that necessary to maintain the selector contact in continuous engagement with one of the selectable contacts, notwithstanding the fluctuating velocity of the latter, there will result a continuous closure of the control circuit with full and continuous operation of the pitch control motor to effect a correction for bringing the engine speed back toward synchronism, the slip-clutch connection 24 between the shaft 21 and the selecting contact permitting relative movement therebetween after engagement of the contacts, to prevent fixed coupling of the driving shafts 21 and 28 through the engaged contacts. The departure from synchronism is thus rapidly reduced by such continued closure of the control circuit to where notching again takes place with shorter and shorter intermittent operations of the pitch-control motor, until synchronism is reached, with the synchronous motor shaft 21 and the selectable contacts rotating at the same speed and the selecting contact out of engagement with both selectable contacts.

Thus the one set of complementary contacts, the selecting and selectable contacts, perform the two functions of first, the selection of one or the other of the two control circuits in response to a departure from synchronism in one or the other direction and second, the production of intermittent brief adjustments or notching during slight departure, with continuous adjustment during wide departure. It is to be noted here that the notching action is not of that type which consists of intermittent brief circuit closures of substantially uniform duration increasing in frequency with increase in departure until the circuit closure becomes continuous or continuous in its effect upon the pitch control motor, but consists of brief closures of substantially constant frequency of occurrence and of variable duration the periods of duration overlapping during wide departure from synchronism to produce continuous correction, and decreasing to a minimum as synchronism is approached.

It will be clear that this frequency of occurrence is determined by the frequency of the periodic velocity-fluctuation, as determined by the difference between the angular velocities of the cam 39 driven by gear 17 and the lever 40 driven by gear 18, while the duration of the intermittent circuit closures for a given machine will vary with the difference in speed of the contact-driving shafts 21 and 28.

The speed of the master motor 11 is maintained substantially constant by a governor mechanism comprising a hollow, cylindrical governor-weight 46 constituting part of a hollow shaft extension 47 of the master motor and carrying a surrounding governor weight 48 mounted on the support by a rock-shaft 49 extending through the hollow portion of the support in pivotal relation with the latter and fixed to the governor weight. A lever element 50 fixed on the governor rock-shaft bears at its upper end 51 against the end portion 52 of a push-rod 53 extending through the hollow shaft 47 into engagement with the switch lever 54 of a vacuum switch element 55 through a thrust bearing 56 carried in the lever head 57. For counterbalancing the weight of elements below the pivot point 156 of the switch lever, such as the lever head 57 and push-rod 53, there is provided a rectangular frame counterweight 157, surrounding and spaced from the vacuum switch and mounted above the pivot point on a pair of arms 155, one of which is shown in Fig. 1, pivoted to the switch holder 255 at 256 coaxially with the switch-arm pivot 156 and connected below the pivot point to the lever head 57. This renders the governor mechanism and switch substantially unaffected by sudden changes in fore and aft movement of the ship. The lever head push-rod 53 and governor weight 48 are biased in the retracted position shown in Fig. 1 by a calibrating compression spring 58 arranged to have its degree of compression against the lever-head adjusted by a movable abutment element 59 adjustable toward and away from the lever-head by a summation screw-gear 60. This screw gear is similar in general arrangement to a differential screw-gear but differs therefrom in that the two threaded portions 61 and 62 of the screw-bolt 63 have left and right-hand threads respectively, so that they act upon the sliding nut element 64 in summation of their thread pitches, to impart to the abutment element 59 a movement of adjustment sufficient in extent to cover the entire desired range of calibration well within a single turn of the speed control knob 65. In the operation of the calibrating screw-gear, rotation of the control knob and its shaft 66 rotates the screw-bolt 63 by means of the splined extension 67 of the latter mounted to slide in and turn with the knob-shaft 66 which causes the threaded portion 62 to travel along the stationary nut element 68. The other threaded portion 61 being integral or otherwise fixed to the bolt moves with the same axial and rotary motion as the threaded portion 62, causing the sliding nut 64, which is mounted to slide without rotation in the sleeve 69, to move axially in the same direction as the bolt and for a distance equal to the axial movement of the bolt plus the relative movement between the sliding nut and bolt due to their threaded engagement. A pointer element 70, movable with the knob and knob-shaft, sweeps over a portion of the front panel 71, such panel portion bearing suitable graduations not shown. The switch element 55 may be of any known or other suitable form, preferably of the vacuum type and capable of controlling a speed-control circuit for the master motor as indicated in the circuit diagram, Fig. 5. Slight, periodically occurring irregularities in load-demand on the master motor, are in large part absorbed by a fly wheel 200.

A master motor tachometer 72 is mounted on a bracket portion 73 of the main frame element 36, positioned as shown in Fig. 1 to be read from the front of the instrument panel and having its drive-shaft 74 driven by a gear 75 meshing with the gear 18 on the countershaft 37 and so proportioned with relation to the gears 18 and 16 as to impart to the tachometer shaft 74 a driving speed of one-half the speed of the master-motor, the tachometer according to general practice giving a reading of twice the running speed of its shaft, corresponding to aircraft engine speed, and the actual speed of the master motor in the present instance.

A second selectable-contact driving gear 76 (Fig. 2) like the gear 20, is arranged in mesh with the fluctuating velocity gear 19 for driving the selectable-contact of a second speed-comparing device not shown, except diagrammatically in Fig. 5, and which, it is to be understood, is similar in all respects to that constituted by the synchronous motor 10 and rotary contact elements 12, 13, and 14 above described, said second device being operatively associated with a second engine to be synchronized with the master motor in a manner similar in all respects to that described in connection with the first mentioned speed-comparing device. Any number of these units may be connected to synchronize a similar number of controlled devices to the master-motor.

Referring now to Fig. 5, here is shown diagrammatically the synchronizer of Figs. 1 to 4 with ancillary circuits and apparatus connected for synchronizing two airplane engines 77 and 78 provided with adjustable pitch propellers 79 and 80 through which adjustment of the engine speed, over a range ample for synchronization, is effected by adjustment of the propeller pitch. Such adjustment is accomplished through the usual reversible pitch-control motor such as the motor 81, associated with the engine 77, having increase and decrease field coils 82 and 83, one for operating the motor in a direction to increase the propeller pitch and the other in a direction to decrease the pitch. The field coils 82 and 83 are connected for energization over conductors 85 and 84 through contacts of relays 87 and 86 controlled from the synchronizing device over control circuits 89 and 88 respectively. Each engine is also provided with a tachometer-type alternator unit, such as the unit 90 associated with the engine 77 for driving its associated synchronous motor-unit 10 in the synchronizing device at constant ratio to the speed of the engine. Similarly a pitch-control motor 91 and alternator unit 92 are operatively connected with the synchronizer device through synchronous motor 93, relays 94 and 95 and control circuits 96 and 97. A gang switch 98 is provided for switching the propeller pitch-control motors from automatic control by the synchronizing device to manual control, at the same time disconnecting the ship's battery 99 from the master motor 11 and other elements of the synchronizing device, and opening two phases of each of the three-phase circuits 100 and 101 which connect the engine alternators with their respective synchronous motors. Each of the selector contacts of the different comparing units of the synchronizer, for example the selector contact 12 of the unit being described, is maintained in electrical connection with one side of the ship's battery 99 here shown as the negative side, through a common or ground connection including the metal frame 36 of the machine, while the selectable contacts 13 and 14 connect through the insulated brushes 31 and 32 to control circuit conductors 88 and 89 respectively each to one terminal of the relays being connected to the positive side of the battery by way of battery conductor 102. The master motor control switch 55 is normally biased in the closed position as indicated at the left of Fig. 5, in which position it maintains a short-circuiting, shunt connection 103—104, around a resistance 105 arranged to be included in series in the energizing circuit of the master-motor 11 upon opening of the shunt at the switch 55. A condenser 106 in series with a low resistance pilot lamp 107 is connected in shunt of the motor control resistance 107 and consequently in shunt of the control switch 55 as an arc suppression filter and indicator, the lamp remaining lighted during rapid closing and opening of the switch.

*Operation.*—In operation, assuming that the gang switch 98 has just been thrown into the position indicated in Fig. 5 with the various other elements in the positions indicated, and the engines 77 and 78 running substantially in synchronism, the three-phase circuits 100 and 101 between the engine alternators 90 and 92 and their respective synchronous motor elements 10 and 93 will be completed for operation of the motors at constant ratio to the speed of their associated engines; the reversing field coils of the pitch-control motors 81 and 91 will be connected for control through the contacts of their associated pairs of relays 86—87 and 94—95 respectively; and the positive or ungrounded side of the ship's battery 99 will be connected over battery conductor 102 to the master motor 11. The master motor is now operated under full power supply over a circuit which may be traced from battery 99, through conductor 102, master motor 11, switch 55 and back over ground to battery 99. The motor speeding up to the predetermined speed to which the governor is set maintains a repeated opening and closing of the switch 55 in response to slight increase and decrease in speed with reference to the chosen standard. Each opening of the switch upon increased speed opens the shunt circuit 103—104 to include the resistance 105 in series in the motor circuit which effects a reduction in motor speed to just below the standard with consequent reclosing of the switch and reacceleration of the motor. Thus the master motor is maintained at a substantially constant speed, the variations in speed being so small in degree and their duration so brief as to be negligible. The fluctuating velocity wheel 19 is thus driven at a substantially constant average velocity of one-half the motor speed on which are superimposed the fluctuations as above described. This fluctuating velocity is imparted to the selectable contacts, of the different comparing devices through their respective driving wheels 20 and 76, to rotate such contacts in the same direction as the selecting contact but at a fluctuating velocity.

With one of the engines, for example the engine 77, rotating off synchronism say slightly faster than the master-motor, the selecting-contact 12, running at slightly higher velocity than the average speed of the selectable contacts will overtake the leading selectable contact 14 to engage the latter during the low-velocity period of the fluctuating velocity. This connects ground to the control circuit conductor 89 to energize relay 87 over a circuit which may be traced from ground over selecting contact 12, contact 14, conductor 27, brush 32, conductor 89, relay 87 and back over battery wire 102 through battery to ground. Relay 87 becoming energized closes its contact 108 which effects operation of the pitch-control motor 81 with the increase-pitch field winding 82 over a circuit which may be traced from ground through motor 81, winding 82, contact 109 of change-over switch 98, conductor 85, contact 108 of relay 87, and back over battery wire 102 through battery to ground. Motor 81 now operating under field winding 82 rotates in a direction to increase the pitch of propeller 79 a small amount proportional to the length of time of closure of relay contact 108 which in turn depends upon the duration of engagement between selecting and selectable contacts 12 and 14 except where such engagement is of shorter duration than the energizing period of the relays which latter period determines the minimum adjustment. The relays may be of any known or other suitable type quick to operate and slow to release, the releasing period chosen being one sufficient to permit a minimum effective adjustment of the propeller pitch. As the leading contact 14 increases in speed under its fluctuating velocity, it will leave the selecting contact 12.

Should the pitch adjustment be insufficient to bring the engine speed down to synchronism, shaft 21 continuing to gain on shaft 28 will continue to effect a brief engagement between contacts 12 and 14 at each fluctuation in velocity continuing the notching operation until synchronism is reached, the adjusting impulses becoming shorter and shorter as synchronism is approched, and until the last short impulse results in an adjustment of speed to very slightly below that of the master motor, whereupon the contact 12 remains out of contact with 14, slowly drifting toward 13. With the engine thus in close approximation to synchronism and running slower than the master motor by an extremely small difference in speed, the selecting contact will remain between and out of contact with the selectable contacts 13—14, gradually approaching the decrease-pitch selectable contact 13 as the propeller continues at its slightly decreased speed or decreases further to a speed slightly lower than that of the master motor, whereupon notching will again take place under control by contacts 12 and 13, through relay 86 and decrease-pitch field winding 83. The control circuit through contacts 12—13 may be traced from ground through contact 12, contact 13, conductor 26, conductor 88, relay 86 and back over battery wire 102 through battery to ground. The circuit of pitch-decrease field winding 83 may be traced from ground through motor 81, winding 83, contact 110 of gang switch 98, conductor 84, contact 111 and back over battery wire 102 through battery to ground.

Whenever the departure from synchronism is great, the resulting wide difference in velocity between shafts 21 and 28 will cause the selecting contact 12 to rapidly overtake the leading contact 14 or be overtaken by the trailing contact 13, as the case may be, maintenance of engagement without undue transmission of force from one shaft to the other being permitted by the slip in the friction clutch connection between the selecting contact 12 and its driving shaft 21. Thus during wide departure the adjustment is continuous with consequent rapid approach to that nearness to synchronism where notching begins, the notching continuing with impulses of substantially constant frequency but decreasing in duration as synchronism is approached. It will be understood that the engine 78 will be maintained in synchronism with the master motor independently of the engine 77 in a manner similar in all respects to that described above for the engine 77. It will also be understood that one of the engines through its synchronous motor may be used as a master motor in place of the master motor 11, for driving the gears 15—16, in which case one of the comparing elements and its accessories would be eliminated. For example the synchronous motor 93 of the engine 78 may be used to drive the gears 15—16 eliminating the master motor 11 and its accessories together with the gear 76 and comparing device and control circuit operated from the latter.

Fig. 6 illustrates diagrammatically a modification in which the comparing devices, each controlled jointly by the master motor and one of the engines to be synchronized, for example the engine 113, comprises a differential gear 114 having input shafts 115 and 116 driven respectively by the master motor 117 and the synchronous motor 118 of the engine 113, and an output shaft 119 for moving the selecting contact 120 in one or the other direction according to which input shaft is running at the higher speed, the output shaft rotating at a speed proportional to the degree of departure from synchronism of the two input shafts.

For the sake of simplicity and closeness of comparison with the system first described, the differential gearing is shown as having an output gear 121 of one-half the diameter of the floating gear 122 giving the selecting contact 120 an angular movement equal to the relative movement between the two input shafts of the differential. Thus as in the system first described, the basic or fundamental relative movement between the selecting contact 120 and the selectable contacts 123 and 124 is equal to the relative movement between the driving shafts 115—116 of the comparing devices. In the present modification the fluctuating velocity of relative movement between the selecting contact 120 and the selectable contacts 123—124 is achieved by providing a reciprocating holder 125 for the latter contacts arranged to be reciprocated in any known or other suitable manner as by the link member 126 and eccentric 127 driven from the master motor 117 through gears 129, 130 and worm gear 131. The gear ratios are chosen to reciprocate the selectable contacts at the notching frequency desired, for example in the neighborhood of fifteen cycles per second, although it is to be understood that the frequency chosen may vary within wide limits. As in the system first described, the arrangement is such that the driving shafts 116—115 for the comparing device are run at half the speeds of the engine 113 and master motor, respectively. However in the present modification the connections are such that the shafts 116 and 115 rotate in opposite directions so that the output shaft 119 will rotate in one or the other direction according to whether the shaft 116 is running faster or slower than the shaft 115, the speed of the output shaft being proportional to the difference between the speeds of these two shafts, in the present case equal to such difference. It is to be understood that this ratio is not critical but may vary according to the speed at which it is desired to have the selecting contact move in response to a given degree of departure from synchronism.

As in the system of Figs. 1 to 5, the selectable contacts 123 and 124 are positioned in the path of movement of the selecting contact 120 for abutting engagement therewith, continued movement of the driving shaft 119 after engagement of the contacts being permitted by a suitable friction slip-clutch connection 132 between the selecting contact and the shaft. The selecting contact 120 is grounded as indicated at 133 so that upon engagement with one or the other selectable contact 123—124 it will complete a circuit from ground through such contact over the conductor 134 or 135, relay 136 or 137, battery wire 138 and ship's battery 139 back to ground.

Relays 136 and 137 may be of any known or other suitable type quick to operate and slow to release, and are arranged, upon energization, to close their respective contacts 140 and 141 for completion of the energizing circuits of the decrease and increase field coils respectively, in circuit with the armature of the pitch-control motor 143. The circuit for the decrease coil 144 may be traced from ground at the pitch-control motor 143 through conductor 145, contact 140, battery wire 138, and battery 139 to ground. Similarly the circuit of the increase coil 146 may be traced through conductor 147 and contact 141.

From the above it will be clear that the operation of the modification of Fig. 6 is similar in all respects to that of Figs. 1 to 5, notching taking place whenever the departure from synchronism is insufficient to drive the selecting contact 120 at a speed to maintain it in engagement with one of the selectable contacts regardless of the reciprocating movement of the latter, and continuous correction taking place during a departure sufficient to maintain continuous contact. Here, too, the frequency of the notching impulses will be substantially constant as determined by the speed of the master motor and the gear ratio between the latter and the eccentric drive for the selectable contact holder, while the duration of such impulses will vary, becoming shorter and shorter as synchronism is approached.

The modification shown in Fig. 7 is like that of

Fig. 6 except that both components of the relative movement between the selecting and selectable contacts are imparted to the selecting contact, the selectable contacts being stationary: Here, referring for example to the portion of the system associated with the engine 148, the fundamental or selecting movement representing in direction the direction of departure from synchronism and in velocity the degree of departure is transmitted to the selecting contact 149 from the output shaft 150 of the differential gear 151 through a friction slip-clutch 152, arm 153, and link 154 which latter is pivoted at 158 and carries at its free end the selecting contact 149. Thus the selecting movement for effecting selection of one or the other of the selectable contacts 159 or 160 by the selecting contact 149, is imparted to the contact 149 as an oscillation about the pivot 158. For superimposing upon the selecting movement, the oscillatory or notching movement, the pivot 158 of the link arm 154 is arranged as a floating pivot carried on an arm 161 reciprocated by an eccentric 162 driven from the master motor 163 in any known or other suitable manner as through the worm gear 164. It will be clear from an understanding of the above described mechanical relations, that when the velocity component imparted to the selecting contact from the differential output in the direction of a given selectable contact is greater than the velocity component away from the latter contact imparted through the reciprocating arm 161, the selecting contact 149 will remain in engagement with the said given selectable contact, continued movement of the differential output-shaft during abutment of the selecting contact against the stationary selectable contact being permitted by the slip-clutch 152. As in the previously described systems, the gear ratios are so chosen that this condition obtains during a given relatively wide departure from synchronism. When the degree of departure is below the given wide departure notching occurs, the notching impulses occurring at a substantially constant frequency as determined by the frequency of reciprocation of the arm 161 and at variable duration becoming shorter and shorter as synchronism is approached, the minimum duration being determined by the time constant of the relay 165 or 166 as the case may be.

The modification shown in Fig. 8 is similar to that of Fig. 7 in that both velocity components are imparted to the one contact element, for example the selecting contact 167, and differs only in that the oscillatory or notching component is derived from the master motor 168 by making the latter hunt or fluctuate in velocity at substantially the desired notching frequency and with an amplitude of velocity fluctuation sufficient to effect notching at substantial departures from synchronism below a given degree. Regulatable hunting by the master motor 168 is accomplished through the use of a self-holding relay 169 arranged to become energized and close a shunt across the terminals of an adjustable motor-circuit resistance 170 through a front contact 171 whenever the motor drops to a given low speed, maintaining the shunt as the motor increases speed until a given high speed is reached, then opening the shunt and maintaining such circuit condition as the motor loses speed until the given low is again reached. The speed governor 172 is of the type shown in Figs. 1 to 4 having an adjustable calibrating spring which together with the adjustability of resistance 170 and the permanently included adjustable resistance 173 affords adjustment of the amplitude and frequency of the fluctuating velocity resulting from the hunting by the motor 168.

A hunting operation of the master motor takes place as follows. With the parts in the position shown, closure of the power supply switch 174 closes the energizing circuit of relay 169 from battery 175, through switch 174, protecting resistance 176, relay 169, governor contacts 177—178 and conductor 179 through ground back to battery. Relay 169, becoming energized, closes a shunt around resistance 170 through front contact 171 and locks itself through front contact 180 over a holding circuit which may be traced from battery 175 through switch 174, resistance 176, relay 169, contact 180, conductor 179 and through ground back to battery. Maximum power as determined by the adjustable resistance 173 is supplied to motor 168 from battery 175, through resistance 173, motor 168, shunting around resistance 170 through contact 171, conductor 179 and ground back to battery.

The motor starting up will increase its speed, the governor 172 moving the governor controlled movable contact 178 out of engagement with contact 177 when a predetermined minimum speed is passed and into engagement with contact 181 when a predetermined maximum speed is reached. At maximum speed, closure of contacts 178—181 completes a shunt across the terminals of relay 169 which may be traced from relay 169, contacts 181-178, contact 180 back to relay 169. Protective resistance 176 protects the battery from short-circuit during closure of this shunt. The relay falling back opens its holding circuit at contact 180 and opens the shunt around resistance 170 at contact 171. The resistance 170 now included in series in the motor circuit cuts down the power supply to the minimum determined by such resistance, and the motor losing speed first causes contact 178 to disengage contact 181, and upon a drop in speed to the predetermined minimum causes contact 78 to again engage contact 177. The circuit of the relay being open at both contact 171 and contact 177 before engagement of contacts 178—177, the relay will remain de-energized until the motor drops to the minimum speed, whereupon closure of contacts 178-177 will again effect energization of the relay over the initial energizing circuit previously traced. This results in a shunting out of the resistance 170 as above described again supplying the motor with the predetermined maximum power, after which the cycle of operation is repeated indefinitely.

As the control of each engine by the master motor is effected in the same manner, a description of the control of one will suffice, for example that of engine 182. Here, as in the previously described modifications shown in Figs. 6 and 7, the input shafts 183 and 184 are driven in opposite directions one by the master motor and the other by the engine 182, respectively, resulting in a movement of the output shaft 185 at a speed proportional to the difference in speed of the input shafts and in one or the other directions according to which shaft is moving faster. In the present instance it is to be assumed that the directions of rotation of the input shafts are such that the input shaft 183 will impart a counter-clockwise component to the output shaft 185, as indicated by the adjacent solid-line arrow, tending to move the selecting contact 167 toward the stationary contact 187, the input shaft 184 imparting a clockwise component, as indicated by the adjacent dotted-line arrow, tending to move the contact 167 toward stationary contact 186.

Upon a wide departure of the engine speed from the mean speed of the master motor, say an increase to greater than the maximum of the master motor fluctuating velocity, the clockwise component imparted to the output shaft 185 will predominate throughout the entire cycle of fluctuations in velocity of the master motor, resulting in a continuously clockwise rotation of the output shaft 185. This rotation of the output shaft operates through the friction slip-clutch 188 to move contact 167 into engagement with contact 186, such engagement being maintained to maintain continuous increase-pitch adjustment of the propeller of engine 182 until, due to a resulting decreased engine speed, a reverse motion of the output shaft 185 takes place. Thus a continuous adjustment is effected during wide departure in either direction from the standard means for which the master motor is set.

When the engine speed is well above the mean velocity but less than the maximum of the master motor fluctuating velocity, the maximum counterclockwise component (derived from the master motor) will be only slightly above the clockwise component (derived from the engine) and only while the master motor is near the upper limit of its fluctuating velocity. Therefore, the right hand component will predominate for only a short time and effect a brief separation of contacts 167—186. Also, the engine speed, being above that of the master motor through the whole cycle of fluctuation of the latter except while the latter is very near the maximum, the engine speed and consequently the left hand component will predominate for a long portion of the cycle.

Thus when the engine speed is well above the mean velocity but less than the maximum master motor velocity there will occur a notching adjustment of long impulses at the substantially constant frequency of fluctuation.

Having shown that with the engine speed above the maximum master motor speed the propeller-pitch adjustment will be continuous, and that with the engine speed slightly below the maximum motor speed but well above the mean, notching will take place with long impulses, it will be clear that as the engine speed approaches the mean the notching impulses will become shorter and shorter.

From the above description of the various modifications it will be seen that an important feature common to all, is that both selection of direction of adjustment and control of notching impulses are effected by the same set of contacts, and that notching takes place with relatively long impulses at departures which are wide but insufficient in degree to require more than a long impulse of adjustment, becoming shorter and shorter as the standard speed is approached.

While certain preferred embodiments of the invention have been herein shown and described for the sake of disclosure, it is to be understood that the invention is not limited to such specific embodiments, but contemplates all such modifications and variants thereof as fall fairly within the scope of the appended claim.

The invention described herein may be manufactured and used by or for the Government of the United States of America for governmental purposes without the payment of any royalties thereon or therefor.

What is claimed is:

In an engine synchronizing system having a controlled engine with an electrically operated means for controlling the speed of the controlled engine, and a pair of control circuits for the speed control means one for effecting an increase and the other a decrease in speed; a control component comprising a master motor, a completely rotatable selector contact, driving means connectable to the engine for driving the selector contact unidirectionally and solely by the engine, a pair of completely rotatable selectable contacts, a second driving means connecting the master motor with the selectable contacts for driving the same unidirectionally and solely by the master motor in a common path and about a common axis with the selector contact, said selector contact and one of the selectable contacts being adapted to close one of the control circuits, and said selector contact and the other selectable contact being adapted to close the other control circuit, said second driving means having means for periodically varying the ratio of transmission of motion from the master motor to the selectable contacts whereby the latter are given a fluctuating velocity of unidirectional rotation having a constant average determined by the master motor only.

KENNETH L. CURTIS.
LA VERNE R. PHILPOTT.
ALLAN G. THOMPSON.

REFERENCES CITED

The following references are of record in the file of this patent:

UNITED STATES PATENTS

| Number | Name | Date |
|---|---|---|
| 309,722 | Maertens | Dec. 23, 1884 |
| 1,485,865 | Meyer | Mar. 4, 1924 |
| 1,953,790 | Warren | Apr. 3, 1934 |
| 2,076,202 | Lewellen et al. | Apr. 6, 1937 |
| 2,109,776 | Johnson | Mar. 1, 1938 |
| 2,144,429 | Martin | Jan. 17, 1939 |
| 2,151,127 | Logan et al. | Mar. 21, 1939 |
| 2,160,324 | Berges | May 30, 1939 |
| 2,217,856 | Brady | Oct. 15, 1940 |
| 2,232,751 | Wilson | Feb. 25, 1914 |
| 2,251,388 | Bates | Aug. 5, 1941 |
| 2,271,629 | Couch | Feb. 3, 1942 |
| 2,334,967 | Thomas et al. | Nov. 23, 1943 |
| 2,408,451 | Sorenson | Oct. 1, 1946 |

FOREIGN PATENTS

| Number | Country | Date |
|---|---|---|
| 289,862 | Great Britain | Aug. 6, 1929 |
| 294,497 | Great Britain | July 23, 1928 |
| 370,242 | Great Britain | Apr. 7, 1932 |
| 409,655 | Great Britain | Apr. 30, 1934 |
| 469,798 | France | May 29, 1914 |
| 517,117 | Great Britain | Jan. 22, 1940 |
| 538,386 | Great Britain | July 31, 1941 |
| 565,071 | Germany | Nov. 25, 1932 |